June 19, 1928.
A. E. PADDISON
1,673,947
ATTACHMENT FOR COOKING UTENSILS
Filed Nov. 2, 1925
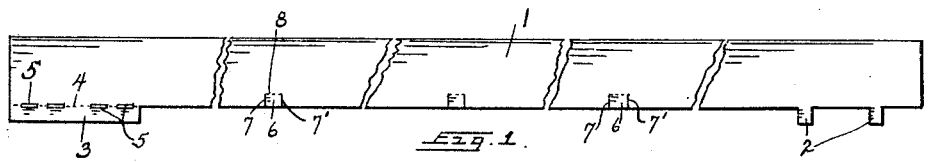
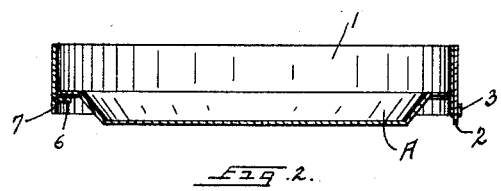
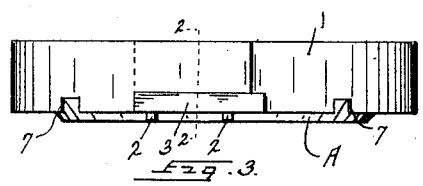
Inventor
Alice E. Paddison
By
J. M. Thomas
Attorney Patented June 19, 1928.

1,673,947

UNITED STATES PATENT OFFICE.

ALICE E. PADDISON, OF SALT LAKE CITY, UTAH.

ATTACHMENT FOR COOKING UTENSILS.

Application filed November 2, 1925. Serial No. 66,210.

My invention relates to cooking utensils and has for its object to provide a new and useful attachment for cooking utensils for trimming the upper and lower unbaked crusts of a pie and preventing the filling from leaking out of the pie while it is being baked.

A further object is to provide a retainer for keeping the filling of single crust pies within the pie pan.

These objects I accomplish with the device illustrated in the accompanying drawings in which similar letters and numerals of reference indicate like parts throughout the several views and as described in the specification forming a part of this application and pointed out in the appended claims.

In the drawings in which I have shown the preferred embodiment of my invention, Figure 1 is a plan view of the retainer strip after it is cut and before it is bent for use. Figure 2 is a section on line 2—2 of Figure 3. Figure 3 is a side elevation of the device in place on a pie pan.

When baking pies having a liquid, and fruit filling, the filling will boil and run out of the pie into the oven, thereby lessening the filling in the finished pie and smudging the pie with burned matter. To overcome this difficulty I have invented a means for sealing the edge of the pie dough to a strip surrounding the pie and pan to which strip the edge of the pie crust is sealed by the expansion of the pie while it is being baked, and to keep all of the filling of the pie in the crust.

In the drawings I have shown the pie pan as A. A flat metal strip 1 is stamped or cut from thin sheet metal, and on one end of which lugs 2 are provided, and on the other end an extended wing portion 3 is struck from the main metal strip 1 on the dotted line 4 and is bent upwardly until it is parallel with the main body of the said strip 1. Slots 5 are cut along the said dotted line 4 and in which the lugs 2 are to be detachably engaged. Spaced apart slits 7 and 7′ are made along the side edge of said strip 1 and the portion of metal between the said slits, shown at 6, is to be bent inwardly on the dotted line 8, to engage under the pan or other utensil, when the device is in place around the utensil. When the pie has been placed in the pie pan A and is ready for baking, the strip 1 is bent around the edge of the pie pan A and the lugs 2 are slipped down through the holes or slots 5 to hold the strip 1, contiguous the edge of the pan while the pie is being baked. With the strip 1 thus secured around the pan the portions of metal 6 between the said slits 7 and 7′ are bent inwardly under the lower edge of the rim of the pie pan and the pie is then ready to be baked, with the device enclosing the pie and pan.

After the strip 1 has been bent to encircle the edge of the pan, the lugs 2 engaged within the slots 5, the pie may be trimmed by pushing the uncut edge of the assembled device down over the pie. When so trimmed the device is placed as described and when the heat of the oven is applied to the pie the expansion of the pie seals the edges to the device and prevents the boiling out of the filling of the pie. There are several of the lugs 2 provided in order that the device may be secured around pie pans of different diameters.

Having thus described my invention and its use, I desire to secure by Letters Patent and claim:—

1. An attachment for cooking utensils comprising a thin strip of metal having spaced apart portions on the lower edge thereof bent to engage with the edge of the pan; means on the lower edge of said strip for connecting the ends together and leaving the upper inside surface entirely unobstructed so that the rim can be inverted to cut off the dough at the edge of the pan, substantially as described.

2. An attachment for cooking utensils comprising a thin strip of metal having spaced apart portions on the lower edge thereof, cut and adapted to be bent to engage with the edge of the pan; and means on the lower edge of said strip for connecting the strip into an annular ring adapted to encircle a pan but with the upper inside surface entirely unobstructed so that the rim can be inverted to remove the dough at the edge of the pan.

In testimony whereof I have affixed my signature.

ALICE E. PADDISON.